United States Patent [19]

Snyder

[11] Patent Number: 4,574,333

[45] Date of Patent: Mar. 4, 1986

[54] LOW DENSITY TANTALUM ANODE BODIES

[75] Inventor: William B. Snyder, Greenville, S.C.

[73] Assignee: Union Carbide Corporation, Danbury, Conn.

[21] Appl. No.: 743,959

[22] Filed: Jun. 12, 1985

[51] Int. Cl.⁴ .............................................. H01G 9/00
[52] U.S. Cl. ...................................... 361/433; 29/570
[58] Field of Search .......................... 361/433; 29/570; 204/49

[56] References Cited

U.S. PATENT DOCUMENTS

| | | | |
|---|---|---|---|
| 2,936,514 | 5/1960 | Millard | 361/433 X |
| 3,093,883 | 6/1963 | Haring et al. | 361/433 X |
| 3,166,693 | 1/1965 | Haring et al. | 361/433 |
| 3,231,800 | 1/1966 | Scherr, III et al. | 361/433 X |
| 4,520,430 | 5/1985 | Long et al. | 361/433 |

Primary Examiner—L. T. Hix
Assistant Examiner—Douglas S. Lee
Attorney, Agent, or Firm—Frederick J. McCarthy, Jr.

[57] ABSTRACT

Tantalum anode bodies having a pressed-in nickel coated tantalum riser wire which provides increased bond strength and improved leakage characteristics.

1 Claim, 6 Drawing Figures

LOW DENSITY TANTALUM ANODE BODIES

The present invention relates to solid electrolytic capacitors. More particularly the present invention is directed to tantalum anode bodies for solid electrolytic capacitors.

Solid electrolytic capacitors are well known in the art and are described for example in U.S. Pat. No. 3,166,693—H. E. Haring and R. L. Taylor and U.S. Pat. No. 2,936,514—R. J. Millard.

The anode bodies used in such devices are commonly prepared by forming bodies of pressed powder of an anodizeable metal, e.g. tantalum. The pressed, porous unsintered tantalum bodies are thereafter heated to sinter the powder particles to provide porous sintered anode bodies of tantalum which are employed as anodes for electrolytic capacitors using known conventional techniques such as described in U.S. Pat. No. 3,093,883 whereby the sintered porous tantalum anode body is anodized and provided with an electrolyte layer which is coated in part with an electrically conductive material, e.g., silver or copper, to provide a cathode termination. An anode riser wire is commonly pressed into the unsintered anode body prior to sintering and anodization. In the conventional practice, the porous, sintered tantalum anode body is relatively dense, e.g., 6 to 10 g/cc and the anode riser wire is mechanically strong and metallurgically bonded to the sintered anode body and the electrical connection between the riser wire and the sintered anode body is sound.

Recently, for economic reasons, it has become important to decrease the amount of tantalum used in an anode body to the extent consistent with achieving satisfactory electrical performance. This has been accomplished by the use of tantalum powder formed of very small flake shaped particles (0.5 to 0.1 micron in thickness) of tantalum having high surface area, e.g., 0.2 to 0.5 $m^2/g$ as compared to previously used powders of as low as 0.05 $m^2/g$ surface area having an average particle size of 1 to 10 microns. The effective use of such small sized high surface area powders has resulted in sintered anode bodies having a very low density in the range of about 3 to 5 g/cc. The desired electrical capacitance is obtainable with such fine sized high surface area tantalum powder; however, the attachment of the tantalum riser wire to such low density anode bodies by conventional pressing techniques has encountered significant difficulties; for example, the bond strength of the attachment is generally poor and as a result the electrical properties of the capacitor are often adversely affected.

It is therefore an object of the present invention to provide a low density tantalum anode body having a sound mechanical and electrical connection to a pressed-in riser wire.

Other objects will be apparent from the following description and claims taken in conjunction with the drawing wherein FIGS. 1, 2 and 2(a) illustrate prior art sintered tantalum anode bodies.

A tantalum anode body in accordance with the present invention is formed of unsintered tantalum particles pressed to a density of from about 3 to 5 g/cc about a tantalum riser wire having a coating of nickel of from about 500 Å to 5000 Å.

Figure 1:
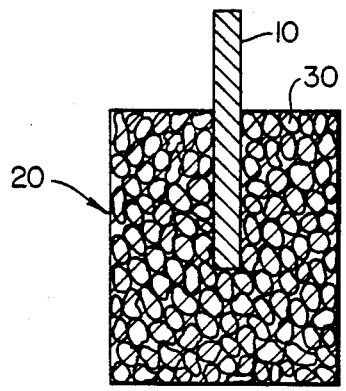

With reference to FIG. 1, in accordance with the prior art, a tantalum lead wire 10 is "pressed in" to porous, unsintered tantalum anode body 20 which has a density of about 6.0 g/cc and higher. Good mechanical and electrical connection is afforded after sintering by the rather large (10–50 micron), relatively low surface area equiaxed particles of tantalum 30 used in the prior art. The particles 30 remain essentially stable during sintering, do not deform easily under stress, and provide many large, strong attachment points for the pressed-in riser wire 10. The anode body 20 is typically 0.1" to 0.3" in diameter and 0.1" to 0.6" in height with a 0.010" to 0.030" diameter riser wire.

Figure 2:
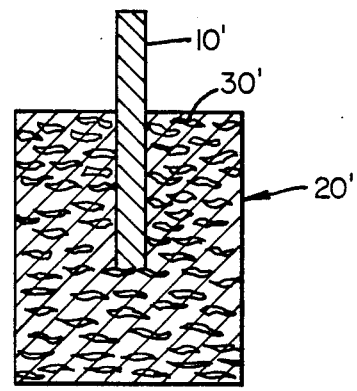
Figure 2A:
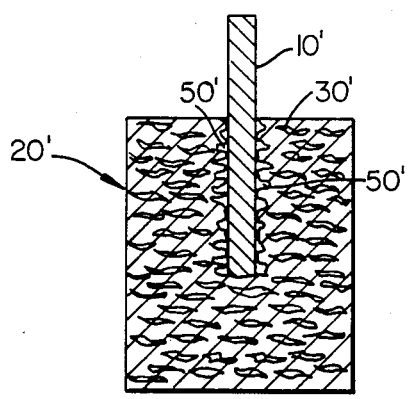

In order to conserve costly tantalum metal and to reduce the size and weight of a given capacitor, attempts have been made to use high surface area tantalum powders to form low density anode bodies, since capacitance is directly related to the tantalum particle surface area. A commonly employed high surface area powder is characterized by very small particle size (about 1 micron in thickness) and thin plate-like flakes of tantalum. FIG. 2 illustrates the problems encountered in the prior art in attaching a riser wire to low bulk density tantalum anode bodies formed of such high surface area powders 30'. The problems become increasingly severe when the density is decreased to 3 to 5 g/cc. The bulk density of solid tantalum is 16.6 g/cc; therefore, such low density unsintered tantalum anode bodies are composed of about 30% metal and 70% void space. In the device of FIG. 2 fewer particles 30' contact the lead wire 10' to hold it in place, and upon sintering of the anode body the smaller contact areas with the lead 10', as illustrated in FIG. 2(a), reduce bond strength and electrical properties. The flake shaped high surface area particles 30' are more easily deformed than equiaxed particles and this factor contributes to loose anode leads, poor bond strength between wire and sintered powder and poor overall electrical performance since the thin and small particles 30' partially melt during sintering and collapse and form voids 50' in the anode body 20'. The particles 30' are flexible and weak and will not hold the wire 10' rigidly in place. The voids 50' are detrimental to the electrical properties and lead to high leakage failures of the capacitor.

Figure 3:
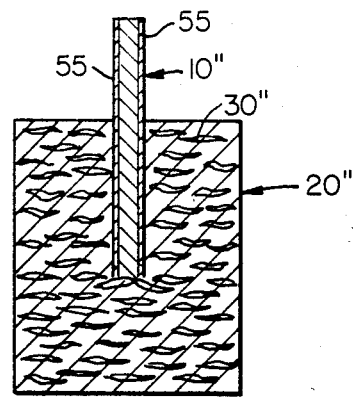
FIG. 3 illustrates an embodiment of the present invention.

With reference to FIG. 3, the device illustrated therein is in accordance with the present invention, and comprises a low density unsintered tantalum anode body 20" formed of tantalum particles 30" pressed about a tantalum riser wire 10" having a peripheral coating 55 of nickel of from about 500 Å to 5000 Å.

The powder 30" is selected for its high surface area and consequently its ability to provide high charge density (e.g., a tantalum powder having a Fisher average particle diameter of about 2, a surface area of about 0.5 $m^2/g$, and a Scott bulk density of about 20 $g/in^3$ such as P1-18 available from Hermann C. Starck, Inc. Berlin.) Binder is added to the powder 30" to lubricate and provide strength for the unsintered body. The high surface area powder 30" is pressed to a desired low density (e.g., 4.0 g/cc) about nickel-coated riser wire 10" and thereafter sintered at a temperature (e.g., 1600° C./15 min.) to metallurgically and electrically bond the tantalum riser 10" to the adjacent tantalum particles 30".

Figure 4:
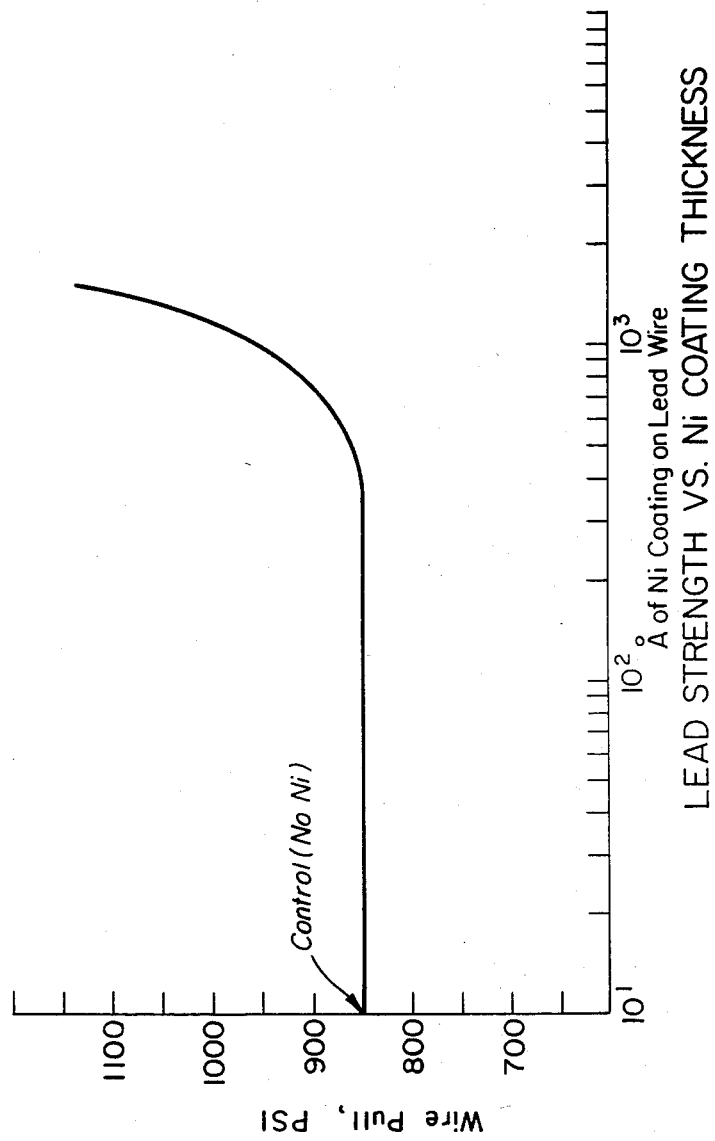
FIGS. 4 and 5 are graphs illustrating properties of the present invention.
Figure 5:
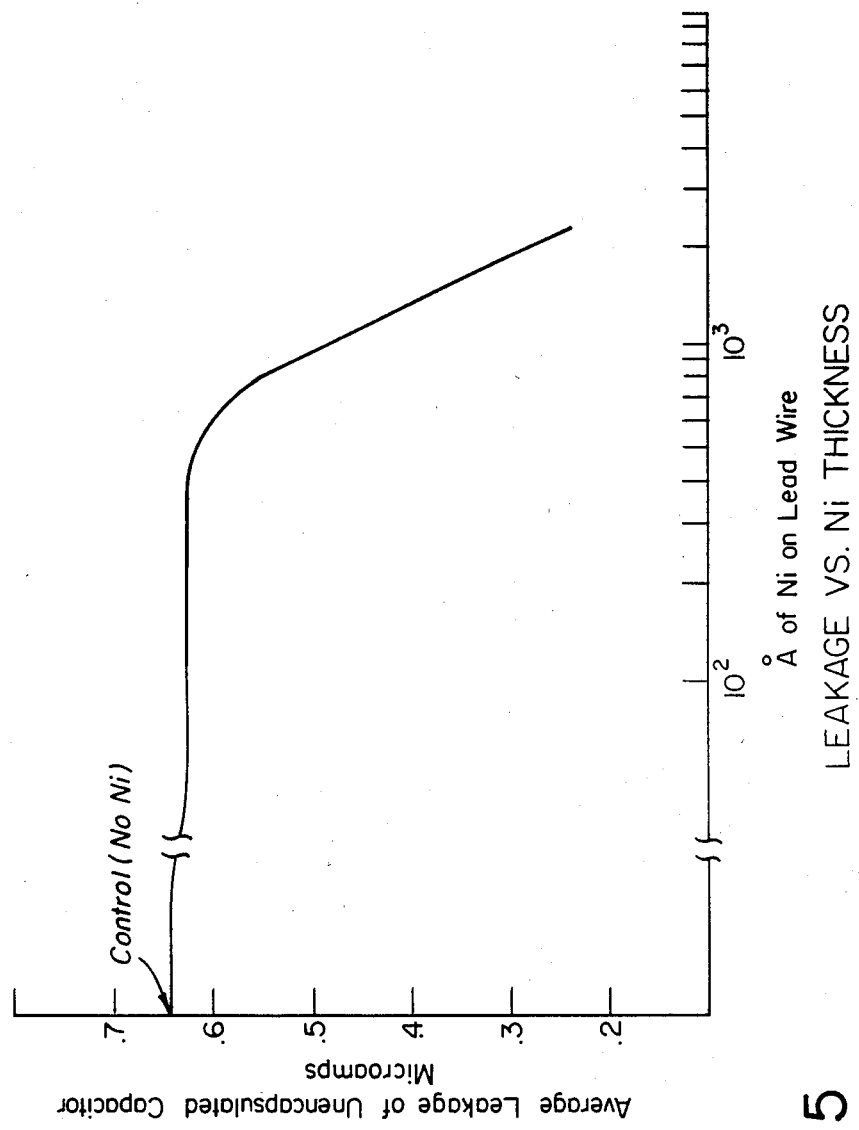

The result obtained through the use of a nickel coated tantalum riser wire in accordance with the present invention is illustrated in FIG. 5 which shows good bonding and electrical contact of tantalum particles 30" to tantalum riser wire 10" as compared to FIG. 4 where a nickel coated riser wire was not used.

In the practice of the present invention, the tantalum riser wire 10" is provided with a coating of nickel 55 of from about 500 Å to 5000 Å thick by conventional techniques, e.g. sputtering. Other techniques such as vacuum deposition, electro and electroless plating, decomposition of nickel resinates may be used. In the course of sintering the nickel coating enables the strong bonding of the riser wire to the anode body; the nickel virtually disappears in the course of sintering and can only be detected by highly sophisticated methods, e.g. Auger spectrometer and does not adversely affect the electrical properties of the capacitor.

The strength of the bond resulting from the use of nickel-coated riser wires with anodes pressed to a density of 3.5 g/cc was determined by a conventional "pull test" whereby the force required to remove the riser wire from the anode body is measured. The results obtained are shown in the graph of FIG. 4 which shows bond strength substantially increased for coating thicknesses of 1000 Å and thicker; the results of electrical tests illustrated in the graph of FIG. 5 show substantial improvement in leakage properties (Ir) for coating thicknesses of 1000 Å and thicker. Nickel coating thicknesses greater than 3000 Å have been found to result in decreased strength and leakage properties.

What is claimed is:

1. A tantalum anode body formed of high surface area tantalum particles pressed to a density of from about 3 to 5 grams/cc about a tantalum riser wire having a coating of nickel of from about 500 Å to 5000 Å.

* * * * *